May 15, 1951 P. V. DYE 2,552,623
SUPPLEMENTAL LIFTING FINGER FOR RECIPROCATING CUTTERS
Filed April 22, 1947 3 Sheets-Sheet 1

INVENTOR.
PAUL V. DYE
BY
M. Y. Charles
ATTORNEY.

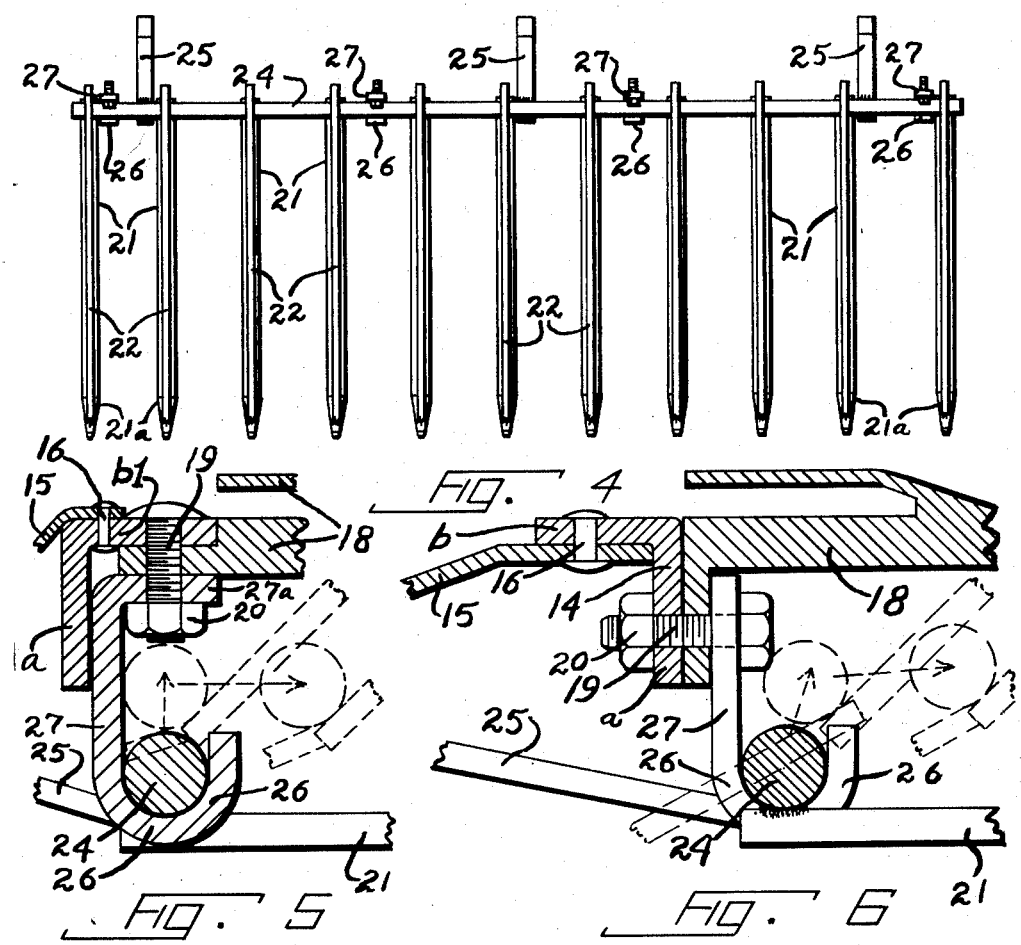
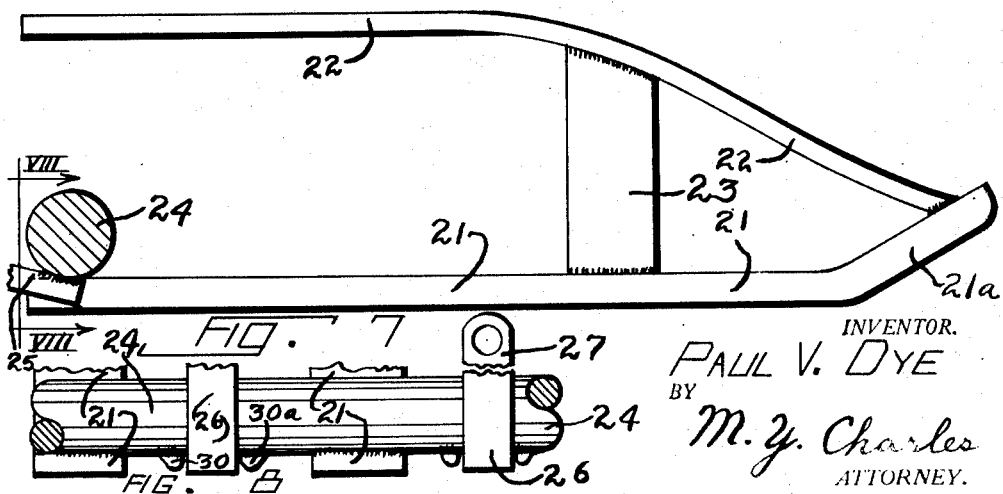

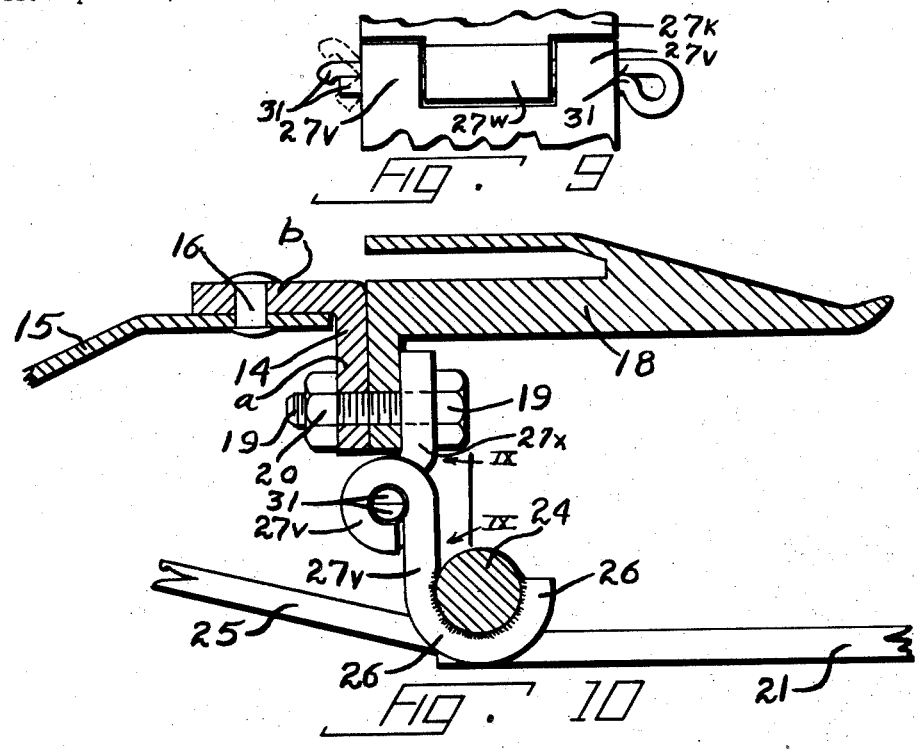
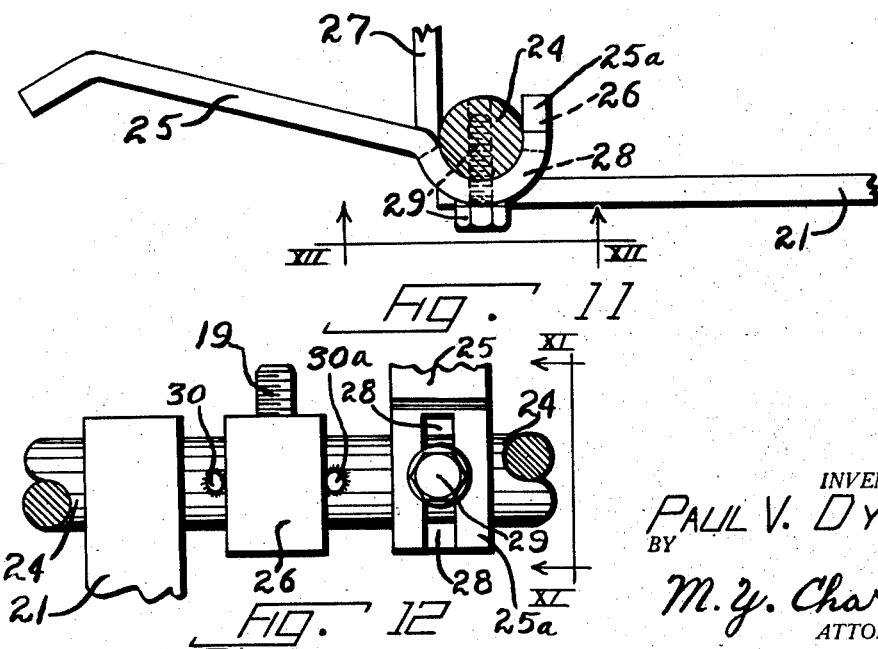

Patented May 15, 1951

2,552,623

UNITED STATES PATENT OFFICE 2,552,623

SUPPLEMENTAL LIFTING FINGER FOR RECIPROCATING CUTTERS

Paul V. Dye, Wichita, Kans.

Application April 22, 1947, Serial No. 743,019

1 Claim. (Cl. 56—312)

My invention relates to an improvement in knee action pick-up guards for sickle bars. An object of this device is to provide a pick-up device of the kind mentioned that is simple in construction, easy and quick to attach to a sickle bar, durable and long lived, one that is inexpensive to make and sell, and one that is exceptionally efficient in doing its work, and one that can be readily attached to any one of several designs of sickle bars. These and other objects will be more fully described as this description progresses.

Now referring to the accompanying drawings in which similar numerals of reference designate the same parts throughout the several figures of the drawings; Fig. 1 is an end view of an auger type conveyor and sickle assembly and other associated parts, and showing my improved pick-up device installed thereon.

Fig. 4 is a top plan detail view of the improved pick-up device.

Fig. 5 is an enlarged detail cross sectional view of one type of sickle bar and illustrating the method of attaching my improved pick-up device thereto.

Fig. 6 is a view the same as that shown in Fig. 5 and showing a different design of sickle bar.

Fig. 7 is an enlarged detail sectional and side view of the pick-up guard and its mounting.

Fig. 8 is a rear view of a portion of the device shown in Fig. 7, the view being as seen from the line VIII—VIII in Fig. 7 and looking in the direction of the arrows.

Fig. 9 is a front view of a modified form of attachment of the pick-up device to the sickle bar; the view being as seen from the line IX—IX in Fig. 10 and looking in the direction of the arrows.

Fig. 10 is an enlarged detail side and sectional view of the modified form of attachment mentioned and shown in Fig. 9.

Fig. 11 is a detail side view of a portion of the pick-up guard and movement limiting device therefor and showing a modified form of their attachment to the stringer rod therefor, the view being as seen from the line XI—XI in Fig. 13 and looking in the direction of the arrows.

Fig. 12 is a bottom plan view of the elements shown in Fig. 11, the view being as seen from the line XII—XII in Fig. 11 and looking in the direction of the arrows.

Figure 1:
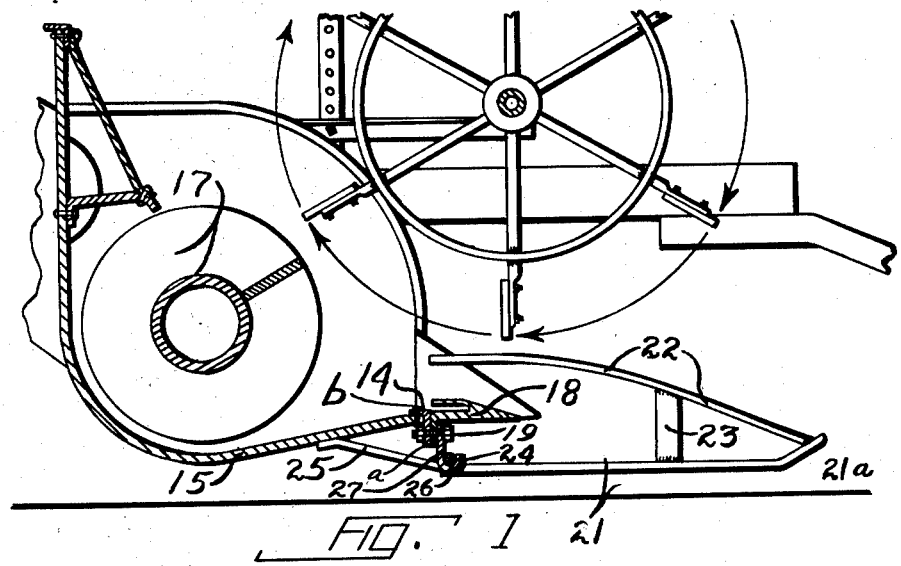
Figure 2:
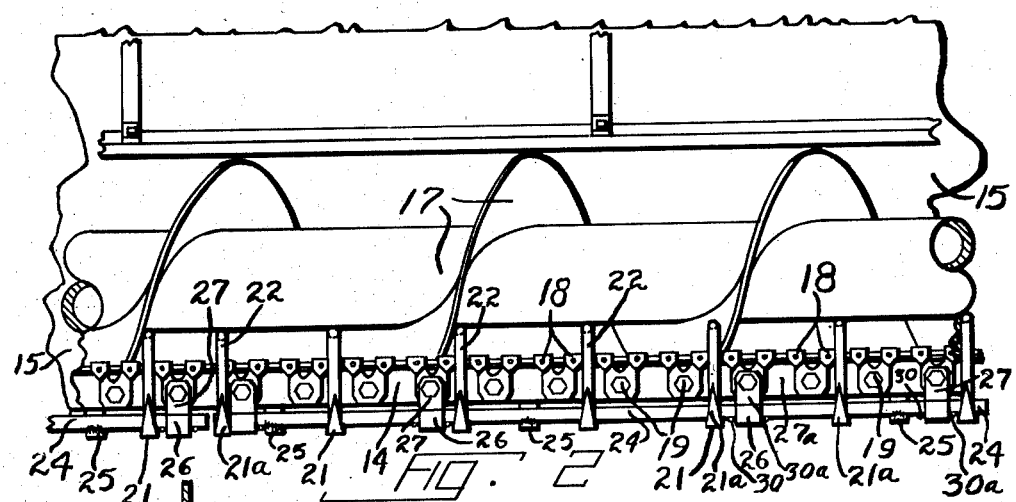
Fig. 2 is a front view of the device shown in Fig. 1.
Figure 3:
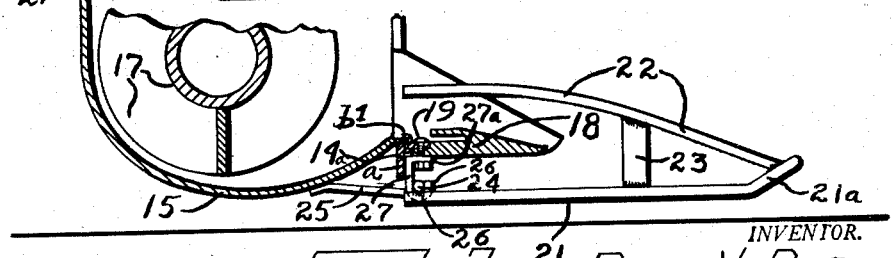
Fig. 3 is an end view similar to that shown in Fig. 1 except that the sickle bar is a different shape from that shown in Fig. 1, and showing my improved pick-up device attached thereto.

In the drawings is shown a sickle-bar bracket 14 which, as shown in Figures 1, 2, 6 and 10 as being an angle iron or L-shaped piece having one leg $a$ turned downwardly and the other leg $b$ turned rearwardly, or as shown in Figures 3 and 5, the sickle-bar bracket 14$a$ has one leg $a$ set vertically and the other leg $b^1$ turned rearwardly.

The machine is provided with a curved trough-like element 15, the front edge of which either passes over or under the horizontal leg $b$ or $b^1$ of the angle iron bracket 14 and is rigidly attached thereto by bolts or rivets 16, and an auger 17 is positioned and is operable in the trough 16.

Sickle guards 18 are bolted either to the vertical leg $a$ of the angle iron 10 as shown in Fig. 6, or to the horizontal leg $b^1$ as shown in Fig. 5 and are so held by bolts 19 and nuts 20 which is standard construction.

My improved pick-up guard comprises a rather long substantially V-shaped frame, the lower leg 21 of which is preferably made of a piece of flat or strap material, the front end 21$a$ of which is curved or tipped upwardly and is drawn to a comparatively sharp point as illustrated in Fig. 2.

The upper leg 22 of the frame or pick-up guard is preferably made of a round rod 22. One end of the rod 22 is welded to the outer or front end portion 21$a$ of the lower leg 21 at a point a little in rear of the extreme point of the portion 21$a$ and extends upwardly and rearwardly therefrom and thence rearwardly in a position substantially parallel with the lower leg 21 of the guard. A strut or brace element 23 is positioned between the forward portions of the legs 21 and 22 and the ends of the brace 23 are welded, one to each leg 21 and 22.

The pick-up guards are spaced apart and the rear end of the lower leg 21 of each guard is welded to the under side of a rod 24.

The device is provided with a plurality of guard stationing bars 25, one end of which is welded to the under side of the rod 24 and the bars 25 extend rearwardly from the rod 24 and the rear ends of the bars 25 rest against the under side of the trough element 15 to support the pick-up guards in an upwardly tipped or horizontal position as will later be described. The rod 24 is rockably seated and carried in a plurality of hook elements 26. Each hook element 26 has a leg portion 27, the upper end of which, as shown in Figures 3 and 5, is turned in an L shape 27$a$, or as shown in Figures 1 and 6, the leg 27 is straight. The upper end of the leg 27 or the L 27$a$ is provided with a hole through which the bolt 19 passes to rigidly bind and hold the hook shank 27 on the sickle bar leg $a$ or $b^1$ as the case may be and as will be readily understood.

When the rod 24 is seated in the hooks 26 and the rear end of the bars 25 rest against the bottom of the trough 15, the rear portion of the lower leg 21 will be positioned below the sickle guard 18 and the outer or front end of the lower leg 21 of the pick-up guard will extend well in advance of the outer end of the sickle guard 18 and support the rear end of the upper leg 22 of the pick-up guard in an elevated position over the sickle guard 18 as clearly shown in Fig. 3.

To attach the device to a sickle bar, a bolt 19 may, one for each support hook shank 27, be removed from the sickle bar bracket and the support shank 27 placed in position and the bolt 19 replaced through the hook support shank 27, sickle guard 18 and sickle bar bracket leg $a$ or $b1$. The hook shank elements 27 having thus been mounted, the rod 24 may be laid in the series of hooks 26 with the rear ends of the bars 25 resting against the bottom of the trough 15 and the device is ready for use.

In Figures 11 and 12 is shown a modified form of the mounting of the support bar 25 on the rod 24. In this design the support bar 25 is provided with a hook-like formation 25a that fits around the rod 24 and is provided with a slot 28 therein through which a bolt 29 passes and is threaded into the rod 24. This arrangement permits the pick-up guards to be adjusted relative to their degree of tip toward or away from the ground. This adjustment may be made by unscrewing the bolt 29 sufficiently that the bar 25—25a is loose on the rod 24 whereupon the bar 25 may be rocked around the rod 24 to the desired position and the bolt 29 may then be tightened to rigidly bind and hold the bar 25 and the pick-up guards in their relative adjusted positions.

The rod 24 is provided with pairs of projecting small ear like elements 30 and 31a that are spaced apart and positioned, one on either side of the hook elements 26 to prevent end movement of the rod 24.

If desired, the rod 24 may be provided with a more substantial mounting such as that shown in Figures 9 and 10. In these figures the mounting device is shown as being a hinge arrangement in which the upper leg 27x of the hinge is attached to the leg $a$ of the sickle bar bracket 14 the same as the previously described hook leg 27 is attached thereto, and the lower leg 27y is provided with the hook 26 in which the rod 24 is seated and is welded thereto. The adjacent ends of the hinge leg elements 27x and 27y are bent into eye formations 27v and 27w and a heavy cotter pin 31 is passed through the eyes 27v and 27w to form the pivotal connection of the hinge portions 27x and 27y. The pick-up device may be readily removed from the machine by removing the cotter pins 31 as will be readily understood.

While the drawings and foregoing description show and describe what are probably the preferable forms of the invention, it is to be understood that such modifications of the invention may be employed as lie within the scope of the appended claim without departing from the spirit and intention of the invention. Now having fully shown and described my invention, what I claim is:

In a pick-up guard assemblage and hanger device therefor, a shaft and a plurality of pick-up guards thereon and rigidly attached thereto in spaced apart and the same relative positions, and means attachable to the sickle bar of a cutting device for rockably supporting said shaft in a spaced distance below and in rear of the forward edge of the sickle bar, said means for supporting said shaft being a plurality of hook elements that are attachable to the aforementioned sickle bar, said shaft being carried in the hook portion of said hook elements, and means rigidly attached to said shaft for engaging other parts of the machine for limiting the rocking movements of said shaft and pick-up guards thereon, the leg portion of said hook element having a hinge joint therein to permit a substantial forward and rearward swinging movement of the said shaft and pick-up guards carried thereby and also to ease the process of assembly and disassembly of the said shaft in and out of the said hooks.

PAUL V. DYE.

REFERENCES CITED

The following references are of record in the file of this patent:

UNITED STATES PATENTS

| Number | Name | Date |
|---|---|---|
| 334,374 | Hamilton et al. | Jan. 12, 1886 |
| 612,630 | McKenzie | Oct. 18, 1898 |
| 763,987 | Kriebel | July 5, 1904 |
| 2,166,723 | Knight | July 18, 1939 |